United States Patent [19]
Sonier

[11] 3,959,627
[45] May 25, 1976

[54] CARD READER
[75] Inventor: Edward Sonier, Salem, Mass.
[73] Assignee: Incoterm Corporation, Natick, Mass.
[22] Filed: Mar. 28, 1974
[21] Appl. No.: 455,929

[52] U.S. Cl................. 235/61.11 E; 235/61.7 B; 340/149 A; 250/569
[51] Int. Cl.².................. G06K 7/14; G06K 19/06
[58] Field of Search............ 250/569; 340/149 A; 235/61.7 B, 61.11 E, 61.11 R, 61.11 D, 61.12 R, 61.12 N; 179/15 BS

[56] References Cited
UNITED STATES PATENTS

| | | | |
|---|---|---|---|
| 3,238,357 | 3/1966 | Minka | 235/61.11 E |
| 3,461,305 | 8/1969 | Moulton | 250/569 |
| 3,463,906 | 8/1969 | Chiang | 235/61.11 E |
| 3,474,232 | 10/1969 | Hearn | 235/61.11 E |
| 3,480,762 | 11/1969 | Del Vecchio | 235/61.11 E |
| 3,627,990 | 12/1971 | Sallach | 235/61.11 E |
| 3,663,800 | 5/1972 | Myer | 235/61.11 E |
| 3,852,572 | 12/1974 | Nicoud | 235/61.11 E |
| 3,858,032 | 12/1974 | Scantlin | 235/61.12 R |

*Primary Examiner*—Daryl W. Cook
*Assistant Examiner*—Robert M. Kilgore
*Attorney, Agent, or Firm*—Kenway & Jenney

[57] ABSTRACT

An apparatus for reading a digital data word stored on a manually inserted card. The card includes a digital data word comprising a plurality of encoded characters stored on the card in the form of a two dimensional data matrix. Each column of the data matrix includes a binary data word representative of one of the encoded characters.

The card reader includes a linear array of row data detection elements and a linear array of column data detection elements. As a card is inserted into the reader, the column data detection elements detect and store the data bits for each of the characters from the rows of the data matrix as those rows pass the column data detection element array. The row data detection array identifies the detected column data with the corresponding row of the data matrix which is currently passing the column data detection element array. Following full insertion of that card into the reader, the complete data matrix may be read out from the card reader memory.

3 Claims, 4 Drawing Figures

CARD READER

BACKGROUND OF THE INVENTION

This invention relates in general to semi-automated dara acquisition systems and more particularly, to systems for reading digital data stored on cards.

Numerous forms of cards having digital data stored thereon are known in the art. Examples of such cards are credit cards having a customer account number, Hollerith encoded tab cards, and employee badges, which may typically include employee data such as employee number, shift number, and pay grade. The dimensions and data format of such badges are presently being standardized by the Credit Card Standard Committee of the American Standards Institute.

The digital data may be stored on such badges or cards in one of many forms. For example, raised areas on the badge or card may be used to denote a data bit (for use with mechanical reading systems employing static contacts). Such mechanical systems are, however, relatively unreliable in that the contact elements are subject to physical damage from repeated use. In other forms, the data words may be encoded by positioning an optically reflective area on the card in an appropriate field to represent a data bit (for use with optical reading systems employing light source and sensor configurations). Alternatively, a hole may be punched in the card in an appropriate field to represent a data bit (for use with optical reading systems employing a light source on one side of the card and a sensor element on the other side). Still other forms might include magnetically encoded data bits (for use with magnetic reading systems).

In each of these cases, the data stored by the card may include a multiple character data word in the form of a rectangular M row × N column data matrix with each column comprising an encoded character of the stored word. For example, a 10 digit decimal number may be encoded by a 10 × 10 data matrix wherein the binary words formed by the 10 bits of the columns are representative of the correspondingly positioned digits or characters of the data word.

Generally, readers for such cards include an array of data detection elements with the individual elements disposed at locations corresponding to the bit locations of the data matrix on the card to be read. When a card is inserted in the card reader and maintained at a fixed position with the data matrix aligned with the detection element array, a reading operation may take place. Thus, in such systems, the detection element array includes a data detection element for each potential bit in the data matrix, e.g., where the data matrix includes ten characters, each having 10 bits, 100 detection elements are required to detect the data word. In addition, the card reader must include means for maintaining the card in a position aligning the data matrix with the detection element array for a duration sufficient for reading.

SUMMARY OF THE INVENTION

It is an object of this invention to provide a card reader in which reading of a card may be accomplished during the period of insertion of a card into the reader.

Another object is to provide a system for reading digital data stored on cards in a binary data matrix in which the card reader includes a linear array of detection elements for sequentially reading a row at a time of the data matrix and includes only a further linear array of detection elements for identifying the row of the data matrix currently being read.

In accordance with the present invention, an apparatus is provided for reading a digital data word stored on a card having information stored on the card in the form of a two dimensional data matrix. Each column of the data matrix includes a binary data word representative of one of the encoded characters.

The card reader apparatus includes a guide means for controlling the orientation of a card inserted therein. In addition, the card reader includes a linear array of column data detection elements, with the number and spacing of the column elements corresponding to the number and spacing of the columns in the data matrix of a card. The array of column elements is disposed so that the individual column elements are aligned with the corresponding columns of the data matrix when a card is inserted in the card reader. The card reader also includes a linear array of row data detection elements, with the number and spacing of the row elements corresponding to the number and spacing of the rows in the data matrix of a card and each column element is uniquely associated with a row of the data matrix. The array of row elements is disposed so that as a card is inserted in the reader, the leading edge of the card is detected by the individual row element associated with the row of the data matrix currently aligned with the column data detection element array.

As a card is inserted into the card reader, the column data is detected and stored for each row of the data matrix as the rows pass the column data detection element array. Following full insertion of a card into the reader, the complete data matrix may be read out from the card reader memory.

BRIEF DESCRIPTION OF THE DRAWINGS

The invention itself will be more fully understood from the following description, when read together with the accompanying drawings in which.

DESCRIPTION OF THE PREFERRED EMBODIMENT

Figure 1:
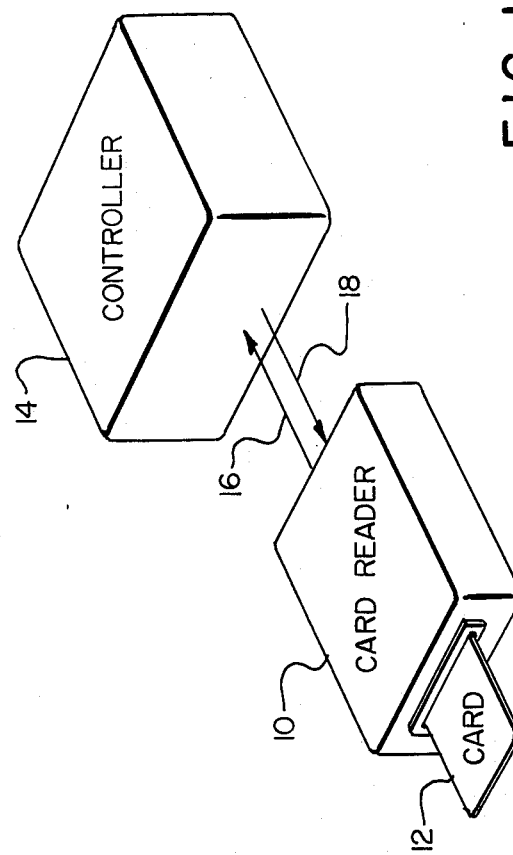
FIG. 1 shows a card reading system in accordance with the present invention.

FIG. 1 shows a card reader 10, together with a card-to-be-read 12 and an external controller 14 which is connected to reader 10 by signal lines 16 and 18. The card reader 10 of the present embodiment is an optical system for use with cards having a data word stored on it in the form of transparent areas such as punched holes. The encoded information is detected by a plurality of data detection elements, each including an optical source and sensor. Alternative embodiments may accomodate cards having data in other forms e.g., raised areas on the card (using mechanical contact elements for data detection), reflective areas on the card (using optical sources and sensors on a first side of the card for data detection), or magnetically encoded regions on a magnetic medium on the card (using magnetic sensors for data detection).

Figure 2:
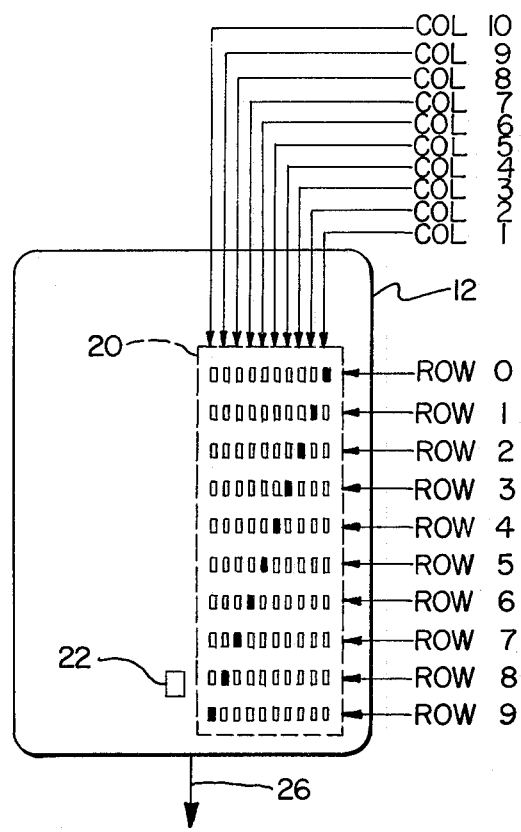
FIG. 2 shows an exemplary card for use with the system of FIG. 1.

FIG. 2 shows a card 10 suitable for use with the present embodiment. Card 10 is an American Standards Institute Type 5 card which may also be used as a Data Collection Badge for IBM 357 and 1030 Badge Readers. In the top view of the card shown in FIG. 2, the data is encoded in 10 rows and 10 columns of data positions, each characterized by one or the other of two states. The data are stored in a 10 × 10 data matrix 20, with each column being representative of a character word. In FIG. 2, the data matrix 20 is shown with rectangles representing data bit locations. The shaded rectangles are representative of punched holes and the remaining rectangles are representative of unpunched holes. Each character word includes a single hole punched in one of the rows with all other rows having no hole punched. Each column may represent one of the 10 digits (0–9) with the row of the punched hole determining the digit value of the character word. Thus, the card in FIG. 1 has encoded on it the number 0123456789.

The card 10 also includes a pawl hole which is offset laterally from the center line of the card in the embodiment of FIG. 2. The pawl hole 22 on the card 12 is used in prior art card readers in conjunction with mechanical means to restrain the badge in the reading position until the read operation is accomplished. However, systems configured in accordance with the present invention require no such restraining since the reading operation is accomplished as the badge is inserted in the card reader, and thus is complete by the time the badge is fully inserted in the reader 10. As described below, this feature permits a detection operation to determine whether a card has been inserted in the proper orientation for a valid reading operation.

Figure 3:
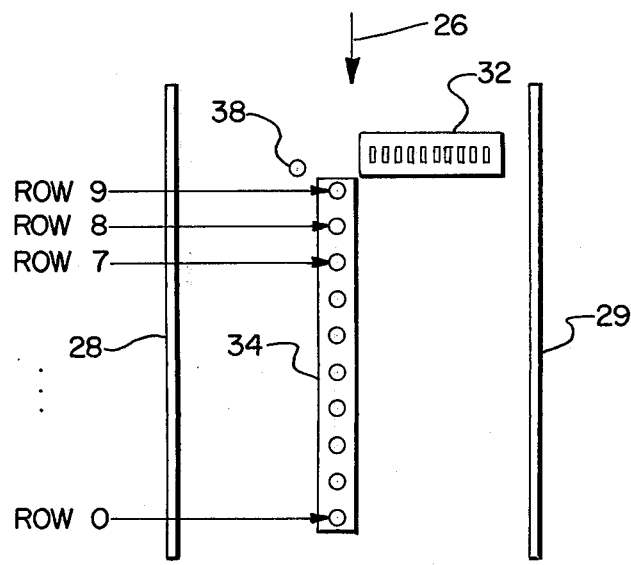
FIG. 3 shows a source/sensor arrangement for reading the card of FIG. 2.

FIG. 3 shows the top view of an optical source/sensor configuration for use with the card of FIG. 2. The card reader 10 includes identical arrays of light sources and sensors so that each sensor is aligned with an associated light source. It will be understood that the card-to-be-read is inserted into the card reader 10 in the direction indicated by arrow 26 in FIGS. 2 and 3, and between the source arrays and the sensor arrays. The card reader 10 includes guide means 28 and 29 to ensure that the card 10 may only be moved in the direction of insertion and may not be moved transverse to that direction. Of course, the card may be removed by a motion in the opposite direction to that motion in the insertion operation.

The source/sensor configuration includes a linear array of column data detection elements 32 comprising a plurality of optical source/sensor pairs, wherein each source/sensor pair is positioned to correspond to a column location of the data matrix on the card 12. Accordingly, for a matrix with N columns, there are N detection elements 32. The source/sensor configuration further includes a linear array of row data detection elements 34 comprising a source/sensor pair associated with each of the rows of the data matrix 20 of card 12, (again, if there are M-rows, there are M-source/sensor pairs). Each sensor of array 34 is positioned so that it senses the leading edge of a card 12 when the associated row of data matrix 20 is aligned with the source/sensor pairs of the column data detection array 32. The elements of row data detection array 34 are further positioned so that the pawl hole 22 is aligned with and passes over that array as the card 20 is inserted into the card reader 10.

In addition to the arrays 32 and 34, a "no badge" source/sensor pair 38 is arranged to provide a signal whenever a badge is inserted into reader 10. It will be understood that the no badge source/sensor pair 38 is positioned appropriately so that false readings may not occur due to the other data holes punched in the card 12.

In operation, as a card or badge 12 is manually inserted into reader 10 from the direction 26, a "badge present" signal is generated by the source/sensor pair 38 and as the badge is further inserted into reader 10, the light from row 9 source to the associated sensor is intercepted by the leading edge of the inserted card. At this point, the row 9 of the data matrix 20 on the card 12 is aligned with the column data detection array 32. The sensor elements of the column data detection array 32 are successively sampled to detect and store signals indicative of the presence or absence of holes (representative of binary "ones" or "zeros") in the corresponding bit positions in the row 9 of data matrix 20. As the card continues to be inserted further into reader 10, the light passing from the row 8 source to its sensor in array 34 is intercepted by the leading edge of card 12 at the point where row 8 of the data matrix is aligned with column sensor 32. The sensor elements of the column data detection array 32 are again successively sampled to detect and store signals indicative of the presence or absence of holes in corresponding bit positions in the row 8 of the word matrix 20. This operation continues for the successive rows of data matrix 20 as the card 12 is inserted further into reader 10. In this manner, the rows of the data matrix 20 of card 12 are successively read during the insertion operation of the card into reader 10 so that upon full insertion of the card 12, the entire data word stored on card 12 has been read from the data matrix 20 and stored in reader 10. The external controller 14 may interrogate reader 10 (via lines 16 and 18) to acquire the data word read from card 12 for subsequent operations on this data word. It will be understood that in an alternative embodiment, the card reader 10 reads the data word on card 12 in the same manner described above during the extraction of the card from the card reader 10 and a parity check may be performed to eliminate potential detection errors in the detection operations.

Figure 4:
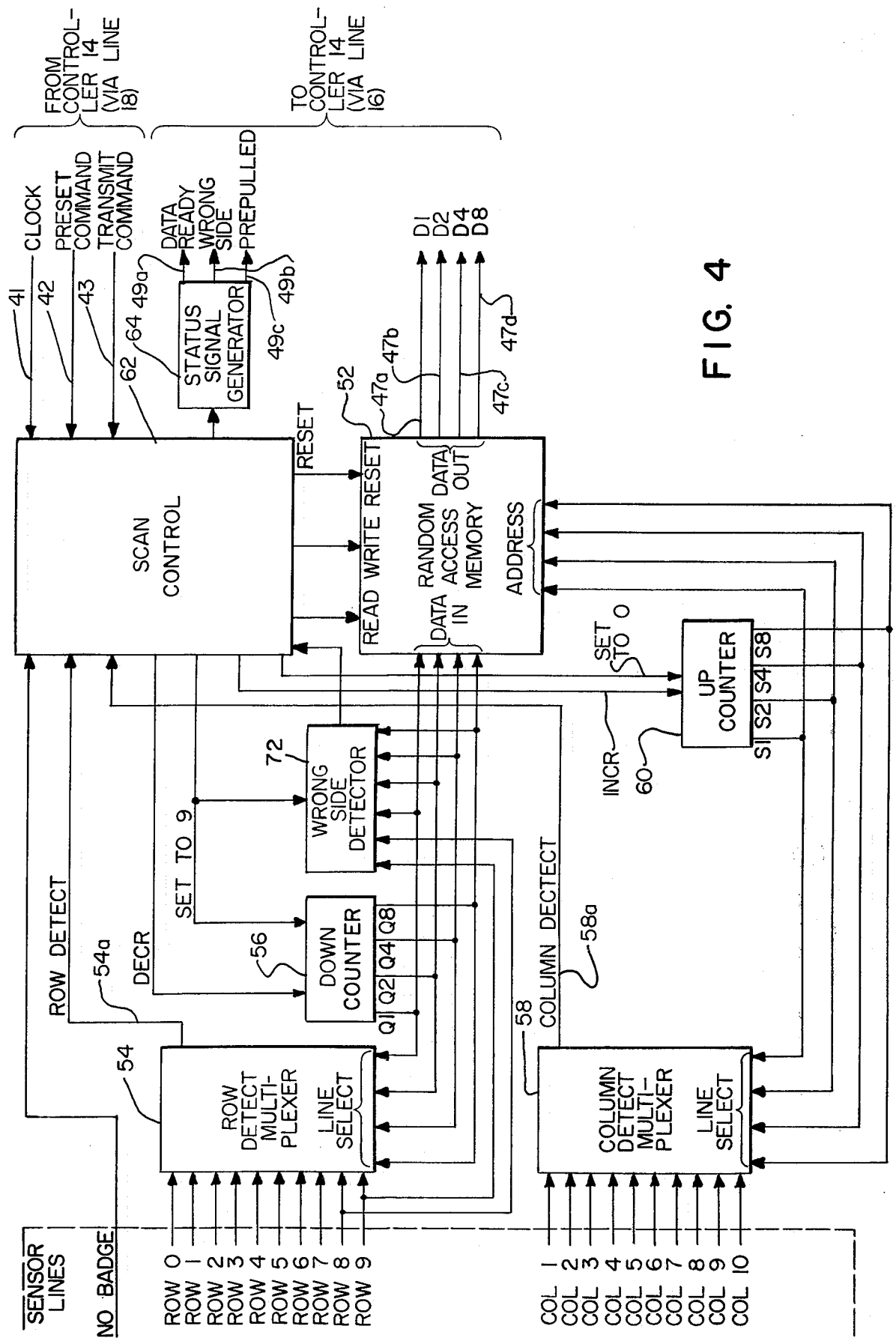
FIG. 4 shows in block diagram form, card reader control logic for the system in FIG. 1.

FIG. 4 shows an exemplary configuration for the card reader control logic for reading the card 12. The row 0-9 input lines of FIG. 4 are connected to the corresponding row data detection sensors in FIG. 3, the column 1-10 lines are connected to the corresponding column data detection sensors in FIG. 3, and the NO BADGE line is connected to the no badge sensor in FIG. 3. In this embodiment, a hole in an inserted card which is between one of the above-mentioned sensors and its associated light source or the absence of a card (permitting light to pass between the source and sensor) places a binary one on the associated line. When no light passes between a source and its associated sensor, a binary zero is placed on the associated line.

The card reader control logic of FIG. 4 is responsive to a controller 14 which is not a part of the present invention. This controller provides the card 10 with a clock signal on line 41, a preset command signal on line 42 and a transmit command signal on line 43. The card reader 10 provides the controller 14 with a four bit data word in lines 47a–d and control signals on lines 49a–c. Lines 41, 42, 43 and 47a–d, 49a–c, are collectively represented in FIG. 1 by lines 18 and 16, respectively.

The card reader may have an alternative embodiment having no external controller 14, but wherein a manual control is provided, which produces the preset command, transmit command and clock signals for reader 10 and in which reader 10 includes a read-out means for displaying the data signal and control signals on lines 47a–d and 49a–c, respectively.

The card reader 10 includes, in addition to the source/sensor pairs described above in conjunction with FIG. 3, a 4 × 10 bit random access memory 52, a row multiplexer 54, down-counter 56, column multiplexer 58, up-counter 60, scan control 62 and status signal generator 64.

As shown in FIG. 4, the down-counter 56 provides signals representative of its count state (Q1Q2Q4Q8) to the line select inputs of row detect multiplexer 54 and to the data inputs of the memory 52. The count state of downcounter 56 is representative of the number of the current row of the data matrix 20 which is aligned with the array of column data detection elements 32.

The up-counter 60 provides signals representative of its count state (S1S2S4S8) to the line select inputs of multiplexer 58 and to the address inputs of memory 52. The count state of up-counter 60 is representative of the number of the currently sampled column data detection element of array 32 during a scan of a row of data matrix 20. Multiplexers 54 and 58 provide row detect signals (on line 54a) and column detect signals (on line 58a) respectively, to the scan control 62.

Status signal generator 64 includes three registers. The first register provides a binary 1 signal on line 49a when a card reading operation is complete, denoting a DATA READY condition. The second register provides a binary 1 control signal on line 49b, denoting a WRONG SIDE condition, when scan control 62 has determined that the card has been inserted in reader 10 with the "wrong side" up or "wrong end first." The third register provides a binary 1 control signal on line 49c, denoting a PREPULLED condition, when control 62 indicates that the card being read has been removed from reader 10 prior to full insertion of the card.

In operation, the external controller 14 may activate card reader 10 for reading a card by applying a clock signal on line 41 and a preset command signal on line 42. In response to the preset command signal, scan control 62 generates control signals which set the down-counter 56 to the count 9 state, set the up-counter 60 to the count 0 state, reset the status signal registers in generator 64 to place binary 0 signals on lines 49a–c and load the memory 52 (via the RESET line) to a predetermined state (e.g., all binary 1's).

The card reader 10 remains in this NO BADGE state until a card 12 is inserted. In response to a card 12 being inserted between the no badge source and sensor pair 38, the no badge sensor 38 provides a control signal on the NO BADGE line input to scan control 62. This control signal, generated when a card is present, maintains the card reader 10 in its operative state until the card is removed (whereupon reader 10 returns to the NO BADGE state). As the card is inserted further into reader 10, the leading edge of the card next passes the row 9 source/sensor of the row data detection array 34. In response, the Row 9 line provides a binary one signal to multiplexer 54. Since the down-counter 56 is in the count 9 state (as indicated above), the binary one on the Row 9 input line to multiplexer 54 as transferred to the row detect output line 54a and applied to scan control 62. This condition indicates to scan control 62 that the row 9 of the data matrix 20 on the card 12 is aligned with the scan column data detection array 32. At this time, a scan cycle is initiated by scan control 62.

In the scan cycle, each element in the column data detection array 32 is sequentially read out to determine which information positions in each row have a binary 1 value. This is accomplished by incrementing a modulo 10 counter 60 to provide that the 10, 4 bit locations in memory 52 are sequentially addressed as the multiplexer 58 sequentially connects each of the elements in column data detection array 32 via the column detect line to the scan control 62. In response to the detection of a binary 1 value on the column detect line, this scan control 62 applies a write signal to the write input of the memory 52, thereby causing the storage of a signal representative of the count state of down-counter 56 (Q1Q2Q4Q8) at the correctly addressed location of memory 52.

As noted above, the up-counter 60 is initially set to the count zero state and thus, the data bit on the Column 1 input line of multiplexer 58 is first transferred via the column detect line 58a to scan control 62. If the signal applied by the column detect line 58a to control 62 is a binary one (indicating that column one includes a hole punched at the current row), then scan control 62 applies a write signal to memory 52 and the state of counter 56 (Q1Q2Q4Q8) is stored at the addressed location corresponding to the state of counter 60 (S1S2S4S8). Since there can be a maximum of one hole punched per column in the card 12 in the presently described embodiment, the memory 52 stores a four bit signal representative of the state of counter 60 as the column 1 character. (It will be understood that other embodiments may utilize different coding in the data matrix wherein more than one hole per column may be present, or, alternatively, where the characters are encoded in the row bits, with each row representing a different character.)

Following the write operation, (or if no write operation is performed because the column 1 line does not indicate a hole in the bit position of the current row), the counter 60 is incremented by control 62 and the column 2 signal is then applied via the column detect line 58a to control 62 and the above process is repeated for writing the words in memory 52 (or not writing when no hole is present). This cycle is repetitively performed for each of the remaining 8 column lines to multiplexer 58. Following the scanning of the column 10 (or last) input line to multiplexer 58, the down-counter 56 is decremented by one unit to the count 8 state and the up-counter 60 is reset to the count zero state.

In response to the setting of down-counter 56 to the count 8 state, the data from the Row 8 sensor line is applied by the row detect multiplexer 54 and the row detect line 54a to the scan control 62. As the card 12 travels farther into the reader 10, the leading edge will intercept light passing between the row 8 source and sensor pair and, accordingly, a binary one signal is applied via the Row 8 line, multiplexer 54, and line 54a to scan control 62. In response, another scan cycle is initiated, and the above described operation is repeated. As the card 12 travels still farther into reader 12, the successive row source/sensor pairs are intercepted by the leading edge of the card 12 and the entire scan process is repetitively performed for each row.

Following the termination of the Row 0 scan cycle, the data ready register of the status generator 64 is set to provide a binary 1 control signal on line 49a, indicating that the card 12 has been fully read.

The inserted card 12 is read to completion unless either of the following two error conditions are encountered:

1. the card was inserted with the wrong side up or the wrong end first (so that the data matrix 20 is not aligned with the column array 32), or
2. the card was removed prior to scanning, detecting and storing data from the last row, Row 0.

The first error condition, denoted WRONG SIDE condition, is detected by the wrong side detector 72. To do so, detector 72 determines if, during the time when downcounter 56 is in the count 8 state, both Row 8 and Row 9 lines indicate that the card 12 is blocking the light from the source to both corresponding sensors. If so, then the card is either upside down, or inserted with its wrong end first since the pawl hole 22 would normally provide a binary 0 on the row 9 line at this point in time during the count 8 state of counter 56. In response thereto, detector 72 applies a control signal to scan control 62 which in turn, sets the corresponding register in status signal generator 64, and applies an appropriate control signal on line 49b.

The second error condition, denoted PREPULLED condition, is determined by detecting when the NO BADGE line returns to its initial state (indicating that card 12 has been removed from reader 10) prior to the detection of and scanning of row 0). This detection operation is provided by scan control 62 and in response thereto, the corresponding register in status signal generator 64 is set so that an appropriate control signal is provided on line 49c. It will be understood that the card must be removed almost completely from reader 10 before this PREPULLED error condition can occur. In such case, the reinsertion of the badge would cause the complete re-reading of the full data matrix 20. As a result of this latter error condition feature, the card reader 10 may accommodate a condition where the badge is "teased" into reader 10 without detrimental effects on the reading of the data due to the fact that once any row is detected and scanned, the presence or absence of the row signal has no effect on subsequent row detection.

It will be understood that if a scan operation is interrupted by the partial prepulling of a card without complete withdrawal of the card, that scan operation may be re-initiated upon the insertion of the card to the appropriate position to generate a row detect signal.

The time required to scan any row is dependent upon the frequency of the clock signal provided by the external control 14, or in other embodiments, by the internally generated clock signal. For the presently described embodiment, at a clock rate as low as 1 KHz, the scan time for one row is on the order of 20 milliseconds, which is a fraction of the time that the holes in that row are positioned over the columns sensors.

Once the reading of the card has been completed, and the data ready signal is applied on line 49a, the data stored in memory 52 may be transferred via lines 47a–d to the external controller 14 or to a separate read-out unit in response to a transmit command applied online 43. The read-out rate of the succession of characters on lines 47a–d is determined by the clock signal applied by the external controller since the scan control 62 increments up-counter 60 to provide the successive addressing operations within memory 52.

Accordingly, the above-described exemplary configuration provides a badge reader for American Standards Institute type 5 badges wherein only 21 source/sensor elements are required to read a 10 × 10 data word matrix (compared with at least 100 required by badge readers of the prior art). In addition, the card reader described above employs no moving parts since the badge motion is provided by the operator who inserts the badge, and since no pawl retention is required. It will be further understood that the above-described system thereby becomes virtually independent of insertion speed.

In alternative embodiments, an 80 column, 12 bit IBM TAB Hollerith encoded card reader may be configured, which uses 65 source/sensor elements (compared with 960 source/sensors or mechanical contacts) for the static readers known in the art.

I claim:

1. Apparatus for reading the information stored on a card in a plurality of information positions forming a data matrix, said matrix having M-rows by N-columns with each information position being characterized by one of two states representing a binary 0 or a binary 1, comprising, guide means for accepting a manually inserted card and guiding said card in a first direction along a predetermined path, as said card is inserted in said guide means at an arbitrary speed, a first linear array of M-row data detection elements extending in said first direction and positioned adjacent to said guide means for sensing the leading edge of said card as it is carried along said guide means in said first direction, and wherein the spacing of said row data detection elements is related to the spacing of the rows in said data matrix, a second linear array of N-column data detection elements perpendicular to said first array and positioned with respect to said guide means so that each of said column data detection elements detects the state of the correspondingly located information positioned in a row of said data matrix on said card as said row passes over said second array, circuit means coupled to said first and second arrays and providing, as the leading edge of a card passes over each detection element in said first array at said arbitrary speed, that the detection elements of said second array are read out to provide output signals indicating for each column of said data matrix on said card the binary value for each information position in the related row of said data matrix.

2. Apparatus in accordance with claim 1 wherein each detection element in said first linear array includes an associated light detector and is associated with a light source.

3. Apparatus in accordance with claim 2 wherein each of the detection elements in said second array includes a light detector and is associated with a light source and wherein each of said information positions provides a first level optical coupling between said associated sources and detectors representing a binary 0 and a second level of optical coupling representing a binary 1.

* * * * *

UNITED STATES PATENT AND TRADEMARK OFFICE
CERTIFICATE OF CORRECTION

PATENT NO. : 3,959,627
DATED : May 25, 1976
INVENTOR(S) : Edward Sonier

It is certified that error appears in the above-identified patent and that said Letters Patent are hereby corrected as shown below:

| | |
|---|---|
| Column 6, line 66: | "reader 12" should read --reader 10--; |
| Column 1, line 5: | "dara" should read --data--; |
| Column 2, line 62: | "accomodate" should read --accommodate--; |
| Column 4, line 25: | "column sensor 32" should read --column sensor array 32--; |
| Column 4, line 52: | Add quotes to --no badge--; |
| Column 5, line 52: | Add quotes to --1's--; |
| Column 5, line 56: | Add quotes to --no badge--. |

Signed and Sealed this

Twelfth Day of October 1976

[SEAL]

Attest:

RUTH C. MASON
*Attesting Officer*

C. MARSHALL DANN
*Commissioner of Patents and Trademarks*